United States Patent [19]

Stieringer

[11] 4,120,038
[45] Oct. 10, 1978

[54] FLASH UNIT WITH ELECTRONIC EXPOSURE SETTING CALCULATOR

[75] Inventor: Albert Stieringer, Weil der Stadt, Fed. Rep. of Germany

[73] Assignee: Robert Bosch GmbH, Stuttgart, Fed. Rep. of Germany

[21] Appl. No.: 774,692

[22] Filed: Mar. 7, 1977

[30] Foreign Application Priority Data

Mar. 10, 1976 [DE] Fed. Rep. of Germany ... 7607299[U]

[51] Int. Cl.² .................................................. G06F 7/38
[52] U.S. Cl. ...................................... 364/705; 235/64.7
[58] Field of Search ................ 235/152, 64.7; 364/705

[56] References Cited

U.S. PATENT DOCUMENTS

| | | | |
|---|---|---|---|
| 2,974,576 | 3/1961 | Hahn | 235/64.7 X |
| 2,978,949 | 4/1961 | Seeger | 235/64.7 X |
| 3,443,749 | 5/1969 | Cimetta | 235/64.7 X |
| 3,769,888 | 11/1973 | Quinn | 235/64.7 X |
| 3,803,834 | 4/1974 | Reese | 58/152 R |
| 3,857,024 | 12/1974 | Kosaka | 235/64.7 X |
| 3,865,994 | 2/1975 | Bender | 235/156 X |
| 3,903,397 | 9/1975 | Yata et al. | 235/64.7 |

*Primary Examiner*—David H. Malzahn
*Attorney, Agent, or Firm*—Michael J. Striker

[57] ABSTRACT

The flash unit, particularly an electronic flash unit, is used with photographic cameras, and the like. The flash unit is provided with an electronic calculator which the photographer uses for calculating the numerical values of camera settings to be established for flash exposure, such as f-number, subject distance, and the like. The electronic calculator forms with the remainder of the flash unit a single camera accessory unit. Components of the calculating circuitry and of the flash unit circuitry are accommodated within a common housing and powered by a common power source. The display of the electronic calculator is located on the exterior of the flash unit, as is also the manually settable input stage of the calculator. The input stage comprises a pushbutton keyboard including digit and arithmetic-operation keys. Alternatively, the input stage is comprised of calibrated scales cooperating with multi-position sliders each capable of assuming only a plurality of discrete positions along the respective calibrated scale.

9 Claims, 2 Drawing Figures

FLASH UNIT WITH ELECTRONIC EXPOSURE SETTING CALCULATOR

BACKGROUND OF THE INVENTION

The present invention relates to photographic units, particularly electronic flash units, provided with means for determining the numerical values of camera settings to be established for the making of flash exposures.

Flash units of the general type in question are often provided with a so-called diaphragm calculator. Typically, the so-called diaphragm calculator comprises two calibrated scales, one for the diaphragm setting and the other for subject distance. These two calibrated scales are typically mounted for relative shifting movement in dependence upon the preliminary setting of the camera for the sensitivity of the film to be employed. Very often, the two calibrated scales are provided on rotatably mounted disks or sliders mounted on the exterior of a wall of the flash unit housing.

It has been found that, for persons not familiar with the manner in which the settings of a photographic camera are to be selected for flash exposures, the correct selection of the settings and the reading and interpretation of the selected settings is difficult and confusing. This is due, in the first place, to the fact that the amateur photographer is presented with a large number of numerical values (up to twenty) inscribed on the various adjuster elements and/or cooperating calibrated scales; very often, the amateur photographer does not completely understand the meanings of these numerical values, in themselves, nor the interrelationships among them. Furthermore, because modern flash units are typically of small dimensions, the so-called diaphragm calculators provided on them are usually of correspondingly small dimensions, so that the various numerical values inscribed on the components of the diaphragm calculator are very small and hard to read, and crowded together in a small space.

SUMMARY OF THE INVENTION

It is a general object of the invention to provide a flash unit with means for determining the numerical values of the camera settings which are to be established for the taking of a flash exposure, not characterized by the disadvantages just discussed.

According to the broadest concept of the invention, this can be achieved by providing the flash unit with an electronic calculator by means of which the photographer can enter numerical data forming the basis of the requisite calculations and be presented with information indicating the numerical values of the camera settings, and the like, to be established.

The invention contemplates using an electronic calculator so designed that entry by the photographer of numerical data forming the basis of the requisite calculation is considerably more convenient and easier to perform than with conventional so-called diaphragm calculators such as discussed above. Likewise, the invention contemplates using an electronic calculator so designed that the photographer is presented with numerical information indicative of the values of the camera settings, and the like, to be established for the flash exposure in a manner which is much easier to read and comprehend than with the so-called diaphragm calculators of the prior art. Preferably, the display of the calculator displays at any one time only a single numerical value of interest, and does not present the photographer with a multitude of numerical values from which the photographer must identify the pertinent one or ones. For example, the single numerical value displayed at a given moment may be the f-number calculated in response to manual entry of information for the guide number and subject distance. The photographer, when thusly presented with the displayed f-number, need only actually set the disphragm adjuster to the displayed numerical value, for example.

According to a preferred concept of the invention, the flash unit and the electronic calculator together form a single camera accessory unit.

According to another preferred concept of the invention, at least some of the components of the electronic calculator are located in the flash-unit housing itself, for example the circuitry of the electronic calculator.

The manually settable input means of the electronic calculator, by means of which the photographer feeds in the information required for the requisite calculation, and also the display upon which the result of the calculator is displayed, are preferably located on the exterior of a wall of the flash-unit housing.

The invention contemplates the disposition of at least part of the display and input means of the calculator on the exterior of the top wall of the flash-unit housing, as constituting the optimum location for ease of manual information entry and for readability of the displayed result of the electronically performed calculation. This expedient is particularly advantageous when the flash unit is provided with a swingably mounted reflector housing.

According to a preferred concept of the invention, both the calculating circuitry of the electronic calculator and the flash circuitry of the flash unit are powered by a common power source, for example a battery accommodated within the flash-unit housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
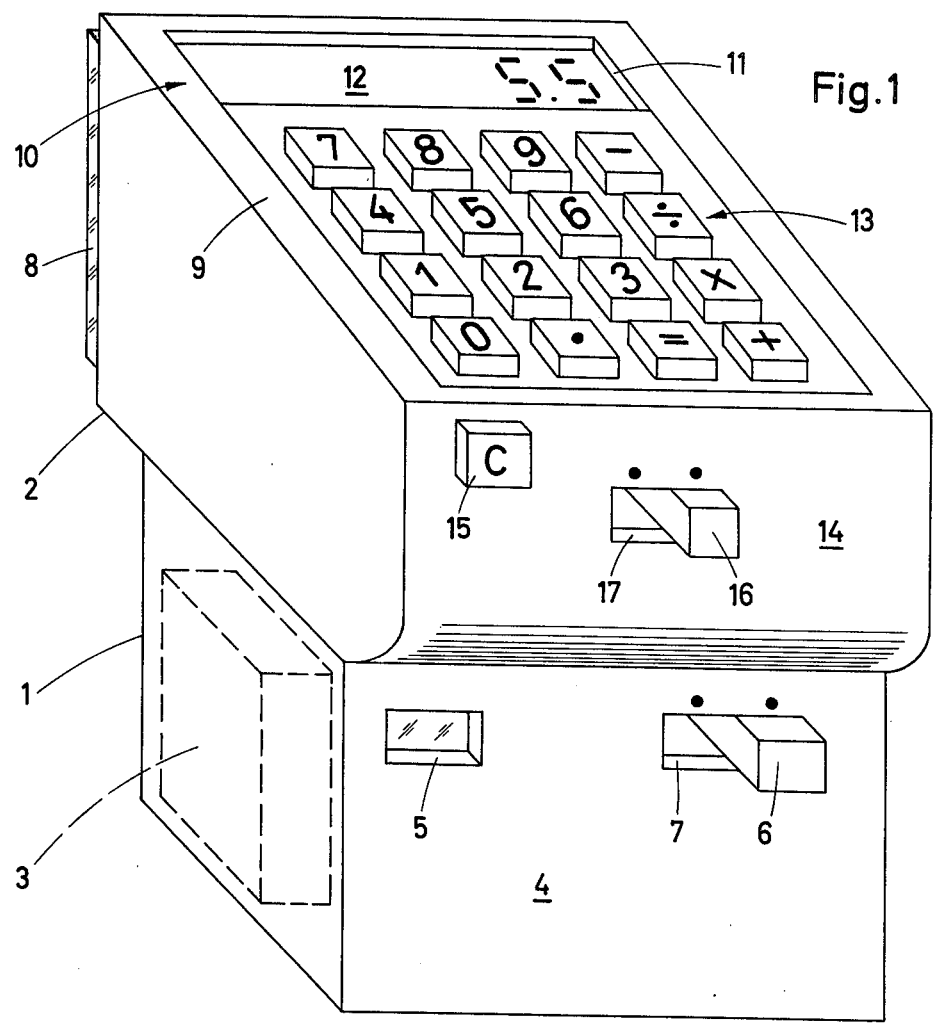
FIG. 1 is a perspective view of a first embodiment of the invention.

The flash unit depicted in FIG. 1 includes a flash-unit housing having a lower part 1 and an upper part 2. Accommodated within the lower housing part 1 is, inter alia, a voltage source 3, for example a flash-unit battery. The back wall 4 of the lower housing part 1 is provided with a window 5 behind which, for example, a glow lamp is arranged, to indicate when the flash unit is ready for operation. A knob 6 guided within a slot 7 in the back wall 4 is shiftable between two positions, for switching the flash-unit circuitry on and off, e.g., for connecting it to and disconnecting it from the flash-unit battery.

The upper part 2 of the flash-unit housing accommodates the flash bulb and reflector of the flash unit. The light-emission opening of the flash unit is covered by a glass plate 8.

The flash unit incorporates an electronic calculator for calculating the numerical value of camera settings, and the like, to be established for flash exposures. In the embodiment of FIG. 1, the electronic calculator is located for the most part at the upper part 2 of the flash-unit housing. The (non-illustrated) calculating and logic circuitry of the electronic calculator (conventional per se) is accommodated within the upper part 2 of the flash-unit housing. The manually settable input means and the display of the electronic calculator are located on the upper wall 9 of the flash-unit housing.

The calculator of FIG. 1 is per se conventional. It includes a display 10, comprising a display window 11 and a multi-digit LED character display set 12. The keyboard 13 of the calculator includes ten digit keys for the digits zero to nine, a decimal-point key, an equal-sign key, and keys for the arithmetic operations addition, multiplication, division and subtraction. Provided on the back wall 14 of the upper part of the flash-unit housing is a clear button 15 and a switch 16 for switching the calculator on and off, e.g., for connecting it to and disconnecting it from the flash-unit battery. The switch 16 projects through a slot 17 in the wall 14.

To perform a flash exposure, the flash unit is mounted on the camera in electrical engagement with the camera synchronizing contacts, and the switch 16 is moved to turn on the electronic calculator. If the subject distance is given, then to determine the f-number to be set, the photographer first enters the numerical value of the guide number of the flash unit, digit by digit using the digit keys, thereafter depresses the division-operation button, then enters the numerical value of the subject distance, digit by digit using the digit keys, and finally depresses the equal-sign button. There then appears upon the display the numerical value to which the objective diaphragm is to be set. For example, if the flash-unit guide number for the film sensitivity involved is 22, and the subject distance is four meters, then from the equation (guide number)/(subject distance) = f-number the f-number 5.5 is displayed. Since this f-number is not available on an ordinary diaphragm setting scale, the number is rounded out to the nearest available f-number, e.g. 5.6.

Instead of the diaphragm setting to be established, the electronic calculator can also be used to determine the subject distance to be established for a predetermined diaphragm setting. Here again, the photographer first enters the numerical value of the flash-unit guide number, then depresses the division-operation key, then enters the numerical value of the diaphragm setting, and then depresses the equal-sign key. There appears upon the display 12 the numerical value of the subject distance, calculated according to the formula (guide number)/(f-number) = subject distance.

After the thusly calculated exposure factor has actually been set on the camera, the flash unit is switched on by means of switch 6. If the storage capacitor of the flash unit is charged, which is indicated to the photographer by the lighting up of the lamp behind the window 5, the flash unit can be triggered in proper synchronism with the opening of the camera shutter by activating the camera release.

Besides the calculations referred to above, the calculator of FIG. 1 could be used to perform other calculations pertaining to the contemplated exposure, or other calculations involving addition, subtraction, division and multiplication. In that event, it may be appropriate to keep the flash unit switched off. The turned-on electronic calculator draws the current which it requires from the voltage source 3 of the flash unit.

Figure 2:
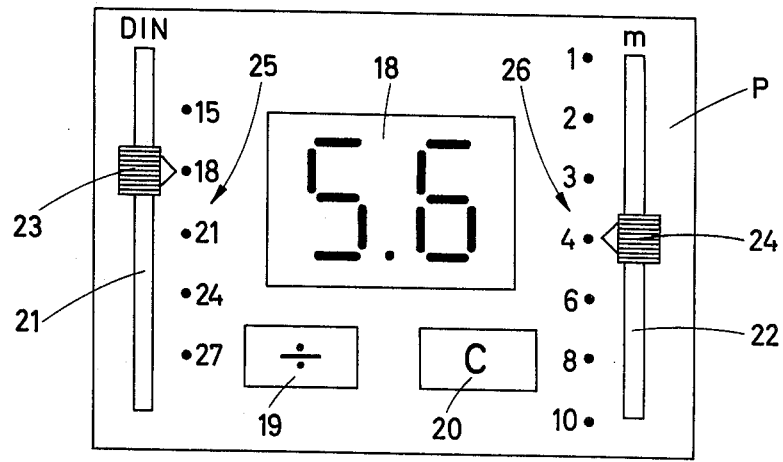
FIG. 2 depicts a second embodiment of the invention.

The electronic calculator shown in FIG. 2 is particularly well adapted for the requirements of flash photography. The calculator includes a display 18 with a multi-place LED character set, a division push-button 19 and a clear button 20. To either side of the display 18 there is provided a respective slit 21 or 22 in a plate P mounted on the flash unit. Extending through the slits 21, 22 are respective sliders 23, 24. Sliders 23, 24 cooperate with scales 25 and 26. Scale 25 is calibrated in units of film sensitivity (DIN), whereas scale 26 is calibrated in units of subject distance (meters). Each slider 23, 24 is a multiposition slider, preferably capable of assuming definitely only the discrete positions corresponding to the numerical values indicated in FIG. 2. In the embodiment of FIG. 2, the photographer need not separately take note of the guide number of the flash unit, because this is automatically taken into account when the slider 23 for the film sensitivity is set. To determine the f-number to be set on the camera, the photographer, after he sets the film-sensitivity slider 23, sets the slider 24 to the intended subject distance in meters, and then depresses the division button 19. The calculated f-number to which the camera is to be set appears upon the display 18.

It will be understood that each of the elements described above, or two or more together, may also find a useful application in other types of constructions differing from the types described above.

While the invention has been illustrated and described as embodied in a particular type of flash unit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a flash unit for use with a photographic camera of the type having exposure-variable adjusters settable to different camera settings for setting the values of independent and dependent flash-exposure variables of the photographic camera, electronic calculating means usable by the photographer for inputting the values of independent exposure variables and operative for automatically calculating therefrom the numerical value of a camera setting to be established for a dependent flash-exposure variable.

2. In a flash unit as defined in claim 1, the flash unit including flash-producing means, the electronic calculating means forming with the flash-producing means a single camera accessory unit.

3. In a flash unit as defined in claim 2, the flash unit comprising a housing and flash-unit components accommodated within the flash-unit housing, the electronic calculating means comprising a plurality of calculating-means components at least some of which are accommodated within the flash-unit housing.

4. In a flash unit as defined in claim 3, the flash unit including a flash-unit power supply, the components of the electronic calculating means being connected to the flash-unit power supply and energized by the flash-unit power supply.

5. In a flash unit as defined in claim 3, the electronic calculating means including display means, electronic calculating circuitry connected to the display means, and manually settable input means connected to the calculating circuitry for applying numerical information to the calculating circuitry, the flash-unit housing having a plurality of housing walls, the display means and input means of the electronic calculating means being located on the exterior of one of the flash-unit housing walls.

6. In a flash unit as defined in claim 5, at least part of the display means and the manually settable input means being located on the exterior of the top wall of the flash-unit housing.

7. In a flash unit as defined in claim 5, the manually settable input means comprising a plurality of pushbuttons depressable by the photographer for applying numerical information to the calculating circuitry.

8. In a flash unit as defined in claim 5, the manually settable input means comprising a plurality of calibrated scales and multi-position sliders slidable along the calibrated scales each capable of assuming only a plurality of discrete positions along the respective calibrated scale.

9. In a flash unit as defined in claim 5, the display means being an electronic display means operative for electronically displaying numerals, the manually settable input means comprising a plurality of manually activatable input members disposed in a rectilinear arrangement, the manually activatable input members being provided with input-indicating numerals indicating the values of input data to be employed in the calculations performed by the electronic calculating means, the display means and the manually activatable input members being disposed not merely in a rectilinear arrangement but furthermore such that the numerals displayed on the electronic display unit and the input-indicating numerals of the manually activatable input members all have one and the same upright orientation, whereby the user of the camera can read the displayed numerals and the input-indicating numerals with all such numerals non-inverted for the user without the user having to rotate or otherwise turn or manipulate the flash unit as a whole.

* * * * *